United States Patent [19]

Hofer et al.

[11] Patent Number: 4,808,814
[45] Date of Patent: Feb. 28, 1989

[54] OPTICAL SYSTEM FOR SENSING FRACTURES IN A STRUCTURAL COMPONENT

[75] Inventors: Bernd Hofer, Lemwerder; Samir Malek, Leuchtenburg, both of Fed. Rep. of Germany

[73] Assignee: Messerschmitt-Boelkow-Blohm GmbH, Muenchen, Fed. Rep. of Germany

[21] Appl. No.: 90,566

[22] Filed: Aug. 28, 1987

[30] Foreign Application Priority Data

Aug. 29, 1986 [DE] Fed. Rep. of Germany ....... 3629430

[51] Int. Cl.$^4$ ........................... H01J 5/16; H01J 40/14
[52] U.S. Cl. ..................................... 250/227; 340/555
[58] Field of Search ..................... 250/227; 350/96.10, 350/96.15; 340/555, 556, 557

[56] References Cited

U.S. PATENT DOCUMENTS

| | | | |
|---|---|---|---|
| 4,450,434 | 5/1984 | Nielson et al. | 340/555 |
| 4,537,469 | 8/1985 | Kirchner | 350/96.10 |
| 4,603,252 | 7/1986 | Malek et al. | 250/227 |
| 4,654,520 | 3/1987 | Griffiths | 350/96.15 |

FOREIGN PATENT DOCUMENTS 0066923 12/1982 European Pat. Off. .

OTHER PUBLICATIONS

Flight International, Mar. 3, 1984, pp. 575-577.

Primary Examiner—David C. Nelms
Assistant Examiner—William L. Oen
Attorney, Agent, or Firm—W. G. Fasse; D. H. Kane, Jr.

[57] ABSTRACT

A system for sensing fractures in a structural component that has a plurality of light conductor fibers attached to or incorporated in the structural component, such as an aircraft body or wings made of fiber reinforced material. The light conductor fibers function as fracture sensors. For this purpose the light supply to each individual fracture sensing light conductor and the interrogation whether a light signal has passed through the light conductors is controlled by a computer. The absence of a light signal at a particular conductor signifies a fracture and this fact may be indicated on a display in the cockpit of an aircraft.

12 Claims, 2 Drawing Sheets

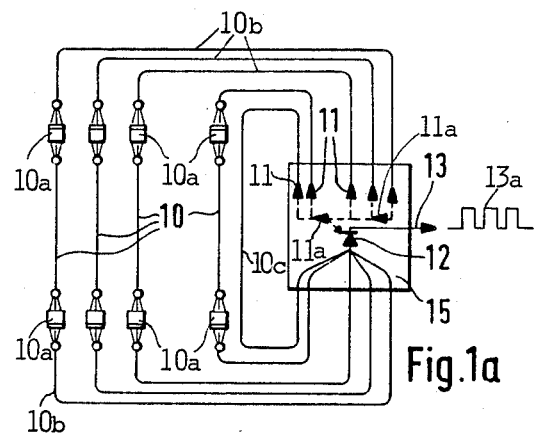
Fig.1a
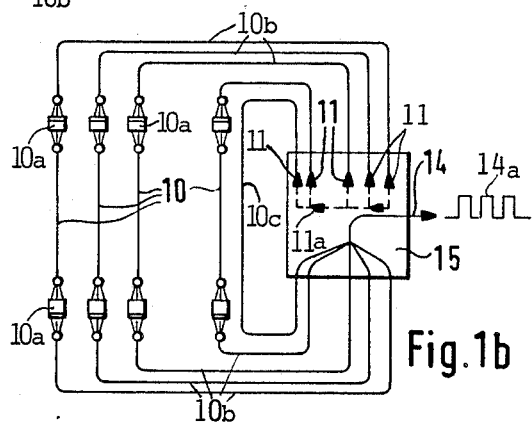
Fig.1b
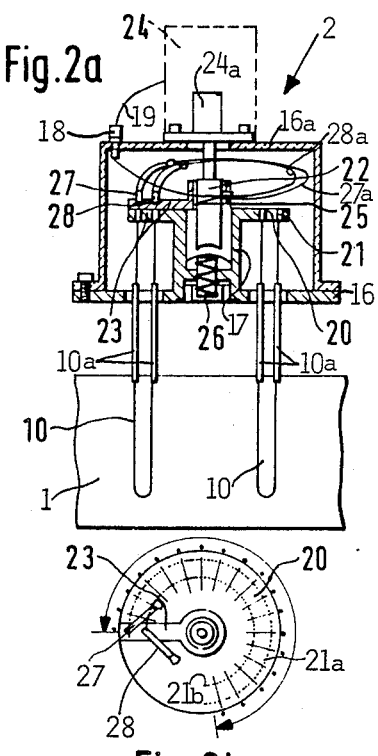
Fig.2a
Fig.2b
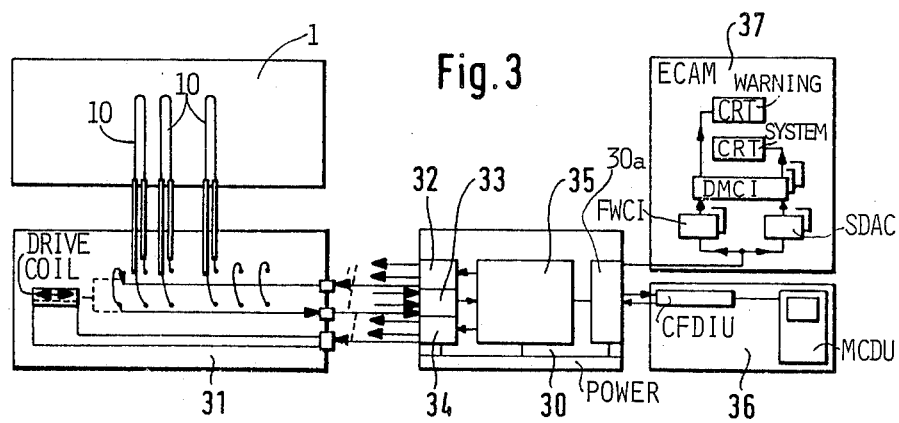
Fig.3

OPTICAL SYSTEM FOR SENSING FRACTURES IN A STRUCTURAL COMPONENT

FIELD OF THE INVENTION

The invention relates to a system for sensing fractures in a structural component, especially in an aircraft component and preferably in structural components made of fiber-reinforced composite materials, whereby light conductors are used as monitoring sensors.

DESCRIPTION OF THE PRIOR ART

Sensing or measuring systems of the above mentioned type are known, for example, from PCT Patent Publication WO No. 82/03454 (Malek et al.) published Oct. 14, 1982. The known system is used for testing structural components of fiber composite materials. Such testing operations involve examinations of structural components to which simulated loads are applied in the laboratory. The monitoring of structural components in actual use, such as an aircraft wing in flight, is not suggested in the above mentioned publication. For testing purposes in the laboratory it is sufficient when the light conductors are secured to the surface of the structural component to be tested. However, especially in connection with structural components of fiber composite material it is possible to integrate the light conducting fibers into the composite material. The use of light conductor fibers for sensing fractures has the advantage of a high verification or detection sensitivity, whereby an indication of a fracture as a result of the fracture of the respective light conductor remains irreversible.

In spite of the undeniable advantages of light conductor fracture sensors, such sensors have not been used heretofore for the continuous monitoring of structures in actual use such as aircraft in flight and so on. The use of a known light conductor sensor system in structures actually in service requires, due to the large number of structural components and component connections, a network system which becomes quite large and heavy and hence is not justifiable.

European Patent Publication No. 0,066,923 (Scott et al), published on Dec. 15, 1982, and based on U.S. Ser. No. 265,031, filed May 18, 1981, now abandoned; and on U.S. Ser. No. 371,321, filed on Apr. 26, 1982, now U.S. Pat. No. 4,409,842, discloses an aircraft structural integrity assessment system for collecting and interpreting data indicative of the effects of at least one of the plurality of forces acting on an aircraft or helicopter structure. The known system comprises structural moment detectors which are basically autocollimators that are insensitive to linear dynamic motions, but responsive to angular deflection of one end of the sensor with respective to the other. The system according to Scott et al includes electronic circuitry for processing the signals provided by the structural moment detectors in such a manner that secondary signals are produced which indicate the effects that are being monitored. The use of light conductors for the sensing of fractures is not suggested by Scott et al.

OBJECTS OF THE INVENTION

In view of the foregoing it is the aim of the invention to achieve the following objects singly or in combination:

to provide a simple, yet functionally certain and safe linking network suitable for the permanent and extensive monitoring of a structure in service, even at locations not accessible for visual inspection;

to provide means for supplying and monitoring widely branched and networked light conductors distributed throughout the structure being monitored such as an entire aircraft;

to provide a mechanism in which many fracture sensing light conductors of an entire network can be sequentially supplied with light and interrogated through a minimal number of conductors so as to minimize the equipment and conductors for the entire monitoring system; and to integrate the monitoring light conductors into a coordinate or reference system so that fault locations, the time of occurrence of a fault, and the extent of damages may be indicated.

SUMMARY OF THE INVENTION

According to the invention the above objectives have been achieved by the combination of the following features. A single light supply conductor or light emission energizing conductor and a single fault indicating signal receiving conductor lead to an interface which is capable of switching a light input sequentially to a plurality of monitoring sensor light conductors and which is further capable of receiving a fracture indicating signal from any one of the light conductors, in the form of an absent signal whereby such an interface may be provided for each zone to be monitored, for example an entire aircraft wing. A computer, for example arranged in the cockpit of an aircraft, cyclically or sequentially interrogates the monitoring signals from all fracture sensing light conductors. When a pulse is missing in a pulse train generated in a monitoring cycle, an indication is provided that there is a fracture in the respective light conductor fracture sensor and a respective failure report may be stored in a memory for later use in the performance of repair work.

The system according to the invention provides the possibility to employ a widely networked fiber optical nerve system in a structural component such as an entire air frame of an aircraft, especially where such air frame is manufactured of fiber-reinforced composite materials since in that instance the monitoring light fibers are incorporated in the structure to be monitored, whereby structural defects can be recognized at an early point of time. This monitoring involves a repeatedly and permanently opto-electronic interrogation of the fracture sensors providing a report of the location of the fracture and of the size of the damage as evaluated by the computer. The interrogation sequence and the frequency how often the interrogations are performed may be determined by a respective program in the computer.

Further important features of the invention are defined in the dependent claims.

BRIEF DESCRIPTION OF THE DRAWINGS

In order that the invention may be clearly understood, it will now be described, by way of example, with reference to the accompanying drawings, wherein:

FIG. 1a discloses one embodiment of an interface between a plurality of light conductors forming fracture sensing loops and a central processing unit;

FIG. 1b is a view similar to that of FIG. 1a, but showing a modified interface;

FIG. 2a is a sectional view of a mechanical scanning device for sequentially interrogating the fracture sensing loops of light conductor fibers;

FIG. 2b is a schematic view in the direction of the central rotational axis of FIG. 2a with the cover removed and in the downward direction;

FIG. 3 is a block diagram of an entire fiber optical nerve system employing the teachings of the invention.

Figure 4:
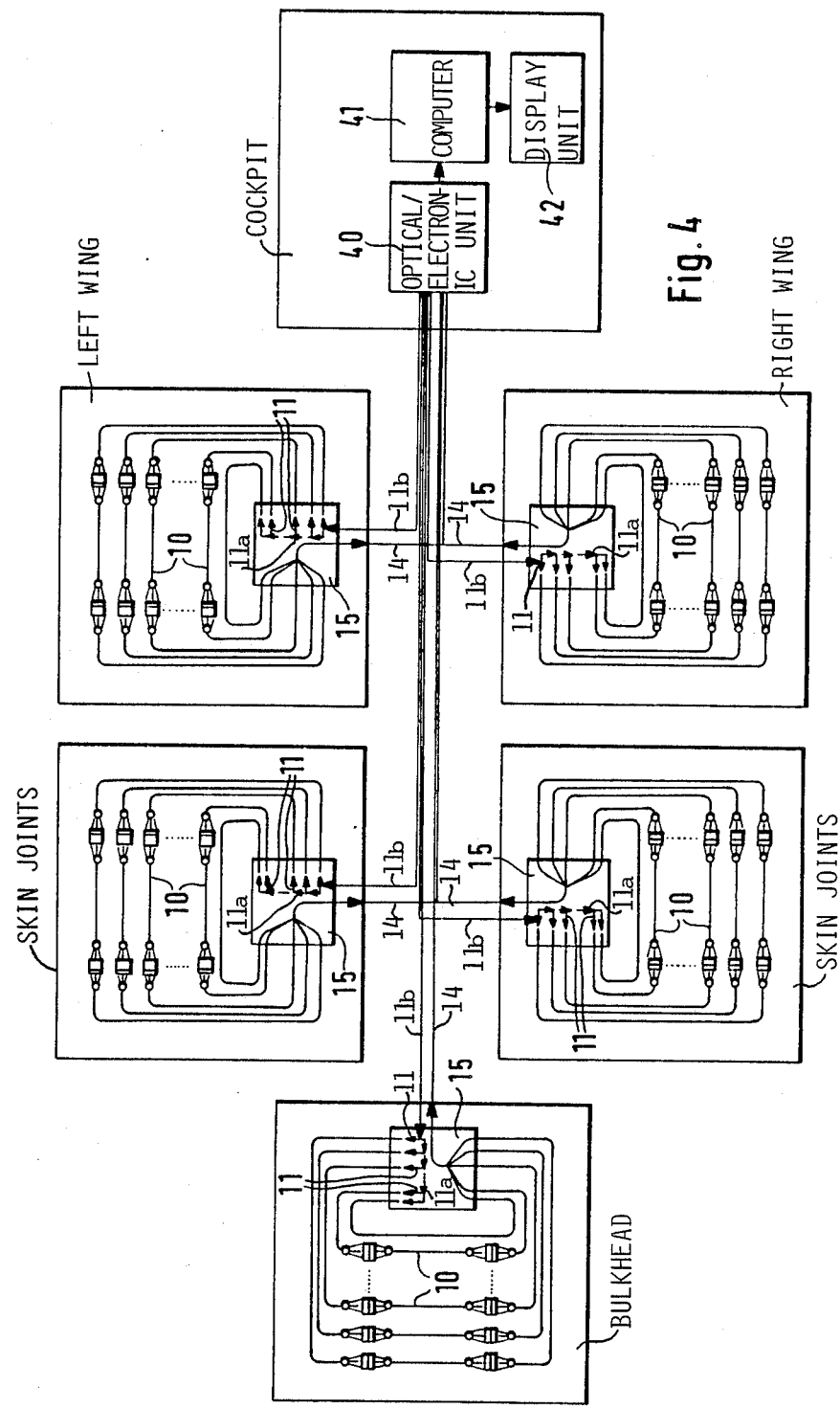
FIG. 4 illustrates a block diagram in which five groups of sensing loops are interconnected for cooperation with a central processing unit to form a fiber optical nerve system, for example in an aircraft.

DETAILED DESCRIPTION OF PREFERRED EXAMPLE EMBODIMENTS ADD OF THE BEST MODE OF THE INVENTION

FIG. 1a shows a group of fiber light conductors 10 which are attached to or incorporated in a structural component 1 such as an aircraft wing made of fiber-reinforced composite material. The fiber light conductors 10 are connected into fracture sensing loops with the aid of plug-in connectors 10a and further light conductors 10b. However, such loops can also be formed without plug-in connectors as shown at 10c. A light input end of each fracture sensing loop is connected to a light emitting diode 11 forming light source means as part of an interface 15 between the fracture sensing loops and a central processing unit, for example shown at 30 in FIG. 3. The other end of each loop is connected to a photodiode 12 forming light monitoring means providing an output signal 13a on a single output conductor 13 provided in common for all loops. The arrowheads 11a are to indicate that the group of light emitting diode 11 are sequentially energized so as to apply a light signal to one loop at a time. Since the physical location of each loop 10 in the structural component 1 is known, and since the timing of the sequential energizing of the light emitting diodes 11 is also known, it is possible to provide a display which shows to the pilot where a fault exists, when the fault occurred, and depending on how many light conductors indicate a fracture, the severity of the fault or faults. The output conductor 13 in FIG. 1a provides a pulse train 13a of electrical pulses which provide the required information. There is no fault in this particular group of fracture sensing loops if all the pulses in a given pulse train are present. However, if a pulse is missing, then that indicates a fracture. The central processing unit 30 performs the required signal evaluation.

FIG. 1b shows a group of fracture sensing loops quite similar to that of FIG. 1a. However, in FIG. 1b the photodiode 12 has been omitted so that a light signal output conductor 14 provides a pulse train 14a of light signals rather than of electrical signals. The light conductor 14 leads to the central processing which is provided with photosensors to evaluate the train 14a light impulses. In FIG. 1b the light emitting diodes 11 are also sequentially energized as indicated at 11a.

The interface 15 may be realized, for example, in an electromechanical way as will now be described with reference to FIGS. 2a and 2b. These FIGS. 2a and 2b show a scanning unit 2 having a base 16 covered by a housing 16a. A centrally located support member 17 is secured to the base 16 and carries at its top a stationary disk 20 is provided with two sets of mounting holes 21. The mounting holes 21 are located along two concentric circles of which the circle 21a forms an outer circle and the circle 21b forms an inner circle. The ends of the loop forming light conductors 10b are mounted in these holes 21, for example, so that the light receiving end forming a light input is located and firmly held in a hole in the outer circle 21a while the respective opposite end providing a light output signal is held in a hole in the inner circle 21b.

A sensor arm 23 is rotatably mounted on a bushing 22 which in turn is rotatable relative to the top surface of the disk 20 and driven by a stepping motor 24a. The stepping motor 24a may be a conventional solenoid providing a drive stroke for each step of the arm 23 and such stroke is converted into rotational movement by a helical member or slanting surface or cam surface 25 which is biased against the bushing 22 by a spring 26. The rotatable or stepping arm 23 carries a light output member 27 in the form of a light wave guide for sequentially applying light to the ends of the light conductors in the holes 21 in the outer circle 21a. The arm 23 also carries a light receiving member 28 for example, in the form of a light wave guide which senses light emanating out of a light conductor end in the holes in the inner circle 21b. Since the light wave guides 27 and 28 are radially aligned with their sensing ends on the arm 23, it is assured that at any one instant these two members 27 and 28 cooperate with the ends of the same loop forming light conductor. Here again, a missing light pulse in a pulse train, produced as the arm 23 rotates, indicates that a particular light conductor has been fractured. Since the positions of the holes 21 are defined, for example by polar coordinates, and since the sensor loops have a fixed relationship to the fixed hole positions, the rotation of the arm provides an indication where a sensor loop has been broken. A light conductor 27a connected to a light source not shown, supplies light to the member 27. A light conductor 28a connected to the member 28 provides the light output signal, for example in the form a pulse train as the arm 23 rotates. The conductors 27a and 28a may form a light conductor cable 19 passing through a connector member 18 in the housing 16a leading to the central processing unit symbolically shown at 24. It is to be understood that the sensing light conductors 10 may be located anywhere in the structure to be monitored and out of sight.

The conductors 27a and 28a form a sufficiently flexible, movable cable which can follow the scanning movement of the arm 23 which may step in one direction for about 270° and then return in the opposite direction to a starting position for performing a new stepping sequence for the next monitoring cycle, or the arm 23 may be stepped backward in the next monitoring cycle and then forward again.

FIG. 3 shows an interface 31 between the fracture sensing light conductors 10 in a structural component 1 and the central processing unit 30. The interface 31 is a fiber optical scanner which may be of the type as disclosed in FIGS. 2a and 2b or it may be of the type in which the individual sensing loops are supplied with light as described above with reference to FIGS. 1a and 1b which are capable of easily handling a substantial number of fracture sensing loops, for example fifty or more such loops are connectable through one scanning unit. The central processing unit 30 comprises controllable light sources 32, light receivers 33 such as photodiodes, and drive amplifiers 34 for the stepping motor, in addition to the microprocessor 35 with its memory for the performance of the various functions, such as initiation of a scanning sequence, interpretation of the scanned information or data, generation of warning signals, whereby for example, a red warning signal would indicate a serious trouble calling for an immediate landing of an aircraft while an amber warning signal would provide information regarding necessary precautions that should be taken. The microprocessor 35 would also provide information regarding required maintenance procedures. An interface 30a connects the central processing unit 30 to a central fault information gathering unit 36 and to an electric central aircraft monitoring unit 37. The units 36 and 37 are part of the conventional equipment of an aircraft. The warning cathode ray tube in the unit 37 may be provided for specifically indicating the above mentioned faults that are severe enough to call for an immediate landing operation.

FIG. 4 illustrates an example embodiment of the invention used, for example, in an aircraft. Five structural components are being monitored, for example, the left wing, the right wing, two skin joints, and a bulkhead. The interface structures 15 are those of FIG. 1b. Each structural unit has one light signal output conductor 14 and one input conductor 11b for sequentially energizing the light emitting diodes 11 in the respective interface 15 as indicated by the arrows 11a. The light conductors 14 lead to respective inputs of the optical electronic unit 40. The output of the unit 40 is connected to a computer 41 which in turn drives a display unit 42 for directly indicating severe faults, for example, those calling for an immediate landing operation.

Due to the fact that a large number of sensor light conductors 10 provided for each structural component, may be serviced by one input conductor 11b and one output conductor 14, the invention reduces the total number of conductors substantially. In the example of FIG. 4 the optical electronic unit 40 has light sensitive inputs comprising, for example photodiodes or phototransistors and electrical outputs for providing the computer 41 with the proper signals that can be processed by the computer 41. However, it is also possible that such optical electronic units comprise electrical inputs and optical outputs.

The computer 41 is programmed to provide the required scanning sequence and the frequency as to how often the scanning shall be performed. The scanning is performed, as mentioned, by sequentially energizing the light emitting diodes 11 through the conductors 11b and the respective processing of the return signals on the conductors 14. When in a determined pulse sequence one or more pulses are missing, the computer 41 will interpret this as a fracture and provide a respective fault report. Such fault report can be directly displayed on the unit 42, such as a cathode ray tube or it may be stored for evaluation prior to any maintenance work. Thus, a pilot operating an aircraft equipped with a fiber optical nerve system as disclosed herein, is in a position to receive information very early regarding the location, the time, and the extent of structural damages. This feature greatly increases the safe operation of an aircraft.

The present system is also suitable for monitoring spacecraft with regard to damages caused, for example, by impacts of space debris or meteorites or the like. Such a system is particularly important and advantageous for structural components made of carbon fiber-reinforced synthetic materials because it is difficult to recognize damages in these materials as compared to metals. Such recognition without the present system is difficult even where massive damages have resulted from impacts.

Although the invention has been described with reference to specific example embodiments, it will be appreciated, that it is intended to cover all modifications and equivalents within the scope of the appended claims.

What we claim is:

1. A system for sensing fractures, comprising aircraft structural components including a cockpit, a plurality of light conductors attached to said aircraft structural components in such locations that at least one of said light conductors is interrupted by a fracture in the respective aircraft structural component, a computer information central processing unit arranged in said cockpit, an interface between said light conductors and said central processing unit, each of said light conductors forming a normally closed fracture sensing loop having a light input end connected to said interface and a light signal output end also connected to said interface, light source means (11,32) arranged for sequentially passing light into each input end of said normally closed fracture sensing loops, light monitoring means (12,33) operatively arranged for sequentially receiving a light signal at said output ends of said normally closed fracture sensing loops for ascertaining whether light condition through any particular fracture sensing loop has been interrupted by a fracture as signified by the absence of a light signal output, means arranged for energizing said light source means, means for sequentially interrogating said light monitoring means, whereby a fracture signal is produced by the absence of a light signal output when a light conductor fracture sensor has been interrupted by a fracture, indicator means in said cockpit for indicating a fracture, and a single output conductor connecting said interrogating means to said central processing unit for transmitting to said central processing unit signals as an indication that a fracture of the respective fracture sensing light conductor loop has occurred.

2. The system of claim 1, wherein said central computer information processing unit comprises clock signal generator means connected to said light source energizing means for controlling a cyclical energizing of said light source means, said clock signal generator means being also connected to said interrogating means for synchronizing the sequential passing of a light signal through said fracture sensing loops with the interrogation of said fracture sensing loops so that a loop that is being energized is substantially simultaneously interrogated, and for controlling the interrogation frequency of interrogation sequences of said interrogating means.

3. The system of claim 1, wherein said light source means comprise plurality of light emission diodes, each operatively connected to said light input end of its respective light conductor fracture sensing loop, wherein said single conductor for connecting said interrogating means to said central processing unit is single light conductor (14) operatively coupled through said interrogating means to all of said light signal output ends of said light conductor fracture sensing loops for transmitting respective light signals to said computer information central processing unit, and wherein said light monitoring means comprise light converting means in said computer information central processing unit for converting said light signals from said single light conductor and absent light signals into respective electrical signals for further processing to provide said indication.

4. The system of claim 1, wherein said light source means comprise a plurality of light emission diodes, each operatively connected to said light input end of its respective light conductor fracture sensing loop, said light monitoring means comprising a single light sensor diode (12) connected to receive light from all of said light signal output ends of said light conductor fracture sensing loops for providing respective electrical signals, and wherein said single conductor for connecting said interrogating means to said central processing unit is a single electrical conductor (13) connecting said light sensor diode (12) to said computer information central processing unit for processing said electrical signals and their absence to provide said indication.

5. The system of claim 1, wherein said means for cyclically energizing said light sources and said means for cyclically interrogating said light monitoring means comprise a stationary disk, two rows of bores through said stationary disk, said two rows of bores forming two concentric circles, one circle being an inner circle, the other circle being an outer circle in said disk, said light input ends being secured in a hole in said circles, said light signal output ends being secured in a neighboring hole in the other of said circles, rotatable arm mounted for rotation relative to said stationary disk and for cooperation with said light conductor ends, light supply means on said rotatable arm for sequentially feeding light into each light input end of said light conductors, means for sequentially sensing light exiting from said light signal output end, and means operatively connected to said arm for rotating said arm to pass along said two concentric circles.

6. The system of claim 5, wherein said means for rotating said arm comprise bushing means for rotatably mounting said arm in said stationary disk, said bushing means having a first slanted surface forming part of a helix, said stationary disk having a second slanted surface located for cooperation with said first slanted surface, whereby said rotatable arm is slightly lifted as it is being rotated, magnetic drive means connected to said bushing means for rotating said rotatable arm, and reset spring means connected between a fixed point and said bushing means for returning said arm into a starting position when said arm reaches a maximum rotational position.

7. The system of claim 6, wherein said maximum rotational position is about 270°, whereby damage to said light supply means and to said means for sensing light is avoided.

8. The system of claim 1, wherein said central computer information processing unit comprises information storage means for storing said signals representing said indication for subsequent evaluation.

9. The system of claim 1, wherein said central computer information processing unit comprises weight factor allocating means for evaluating said signals representing a fracture to determine the seriousness of the respective fracture to the continued operation of said structural component, and display means connected to receive signals for displaying the seriousness of a respective fracture.

10. The system if claim 9, wherein said display means are arranged in a cockpit of an aircraft.

11. The system of claim 1, wherein each of said light conductor fracture sensing loops has a location characterizing designation which has a fixed correlation with a particular location of the respective light conductor, whereby the respective fracture information also substantially pinpoints the location of a fracture within the structure such as an aircraft.

12. The system of claim 1, wherein said light source means and said light monitoring means are arranged in said interface.

* * * * *

UNITED STATES PATENT AND TRADEMARK OFFICE
CERTIFICATE OF CORRECTION

PATENT NO. : 4,808,814
DATED : February 28, 1989
INVENTOR(S) : Bernd Hofer, Samir Malek, Carsten Roenner It is certified that error appears in the above-identified patent and that said Letters Patent is hereby corrected as shown below:

Title page:

In [75] Inventors: the third inventor's name and residence was omitted and should read as follows:

--Carsten Roenner, Delmenhorst, Federal Republic of Germany--.

In [57] Abstract, line 2, delete "that".

Claim 1, line 18, (Column 6, line 24), replace "condition" by --conduction--.

Claim 3, line 2, after "comprise" insert --a--, (Col. 6, line 51); line 6, after "is" insert --a--, (Col. 6, line 55).

Signed and Sealed this

Twenty-second Day of August, 1989

Attest:

DONALD J. QUIGG

*Attesting Officer*

*Commissioner of Patents and Trademarks*